(12) United States Patent
Orlando et al.

(10) Patent No.: US 6,684,626 B1  
(45) Date of Patent: Feb. 3, 2004

(54) AIRCRAFT GAS TURBINE ENGINE WITH CONTROL VANES FOR COUNTER ROTATING LOW PRESSURE TURBINES

(75) Inventors: Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 57 days.

(21) Appl. No.: 10/208,303

(22) Filed: Jul. 30, 2002

(51) Int. Cl.[7] ................................................. F02K 3/00
(52) U.S. Cl. ....................... 60/268; 60/39.162; 415/65; 416/128; 416/129
(58) Field of Search ............................ 60/39.162, 269; 415/65, 66, 68, 69; 416/128, 129

(56) References Cited

U.S. PATENT DOCUMENTS

| | | |
|---|---|---|
| 4,010,608 A | 3/1977 | Simmons |
| 4,064,692 A | 12/1977 | Johnson et al. |
| 4,860,537 A | 8/1989 | Taylor |
| 4,965,994 A | 10/1990 | Ciokajlo et al. |
| 4,969,325 A | 11/1990 | Adamson et al. |
| 4,976,102 A | 12/1990 | Taylor |
| 5,010,729 A | 4/1991 | Adamson et al. |
| 5,274,999 A | 1/1994 | Rohra et al. |
| 5,307,622 A | 5/1994 | Ciokajlo et al. |
| 5,361,580 A | 11/1994 | Ciokajlo et al. |
| 5,404,713 A | 4/1995 | Johnson |
| 5,443,590 A | 8/1995 | Ciokajlo et al. |
| 5,809,772 A | 9/1998 | Giffin, III et al. |
| 6,339,927 B1 | 1/2002 | DiPietro, Jr. |
| 6,393,831 B1 | 5/2002 | Chamis et al. |
| 6,619,030 B1 * | 9/2003 | Seda et al. ................. 60/226.1 |
| 2003/0163983 A1 * | 9/2003 | Seda et al. ................. 60/226.1 |
| 2003/0163984 A1 * | 9/2003 | Seda et al. ................. 60/226.1 |
| 2003/0200741 A1 * | 10/2003 | Moniz et al. .............. 60/226.1 |

* cited by examiner

*Primary Examiner*—Justine R. Yu
*Assistant Examiner*—William H. Rodriguez
(74) *Attorney, Agent, or Firm*—William Scott Andes; Steven J. Rosen

(57) ABSTRACT

An aircraft gas turbine engine includes a low pressure turbine having a low pressure turbine flowpath and counter rotatable low pressure inner and outer shaft rotors having inner and outer shafts, respectively. The low pressure inner and outer shaft rotors include low pressure first and second turbine blade rows disposed across the turbine flowpath and drivingly connected to first and second fan blade rows by low pressure inner and outer shafts, respectively. At least one of the low pressure first and second turbine blade rows is interdigitated with an adjacent pair of one of the turbine blade rows. At least one row of non-rotatable low pressure vanes is disposed across the low pressure turbine flowpath between a non interdigitated adjacent pair of one of the turbine blade rows.

30 Claims, 5 Drawing Sheets

AIRCRAFT GAS TURBINE ENGINE WITH CONTROL VANES FOR COUNTER ROTATING LOW PRESSURE TURBINES

BACKGROUND OF THE INVENTION

1. Field of the Invention

The invention relates to counter rotating aircraft gas turbine engines with counter rotating fans driven by counter rotating low pressure turbine rotors and, particularly, for such engines incorporating vanes to effect unequal power splits between the counter rotating low pressure turbine rotors.

2. Description of Related Art

A gas turbine engine of the turbofan type generally includes a forward fan and booster compressor, a middle core engine, and an aft low pressure power turbine. The core engine includes a high pressure compressor, a combustor and a high pressure turbine in a serial flow relationship. The high pressure compressor and high pressure turbine of the core engine are interconnected by a high pressure shaft. The high pressure compressor, turbine, and shaft essentially form the high pressure rotor. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Some low pressure turbines have been designed with counter rotating turbines that power counter rotating fans and booster or low pressure compressors. U.S. Pat. Nos. 4,860,537, 5,307,622, and 4,790,133 disclose counter rotating turbines that power counter rotating fans and booster or low pressure compressors. Most of the thrust produced is generated by the fan.

Advanced gas turbine engines having counter rotating forward and aft fans and counter rotating boosters are being designed. It is desirable to design a counter rotating engine with a peak performance. It has been found that a peak performance can be attained when the forward fan operates at a higher fan pressure ratio and higher rotational speed than the aft fan. This can result in a substantial mis-match in horsepower and rotational speed between the counter rotating rotors. The counter rotating low pressure turbine is required to supply the necessary power to each of the forward and aft fans at the rotational speed of each fan. A conventional counter rotating turbine will operate at peak efficiency when the power split between both shafts is equal and when the rotational speeds are equal and opposite. In such a case, speed and horsepower ratios of the two rotors and turbines are substantially 1. It is highly desirable to have a gas turbine engine with counter rotating low pressure turbines that have different speed and horsepower ratios such as speed and horsepower ratios of 1.2 or more to attain peak fan efficiency.

SUMMARY OF THE INVENTION

An aircraft gas turbine engine includes a high pressure rotor having a high pressure turbine drivingly connected to a high pressure compressor by a high pressure shaft and rotatable about an engine centerline. A low pressure turbine having a low pressure turbine flowpath is located aft of the high pressure rotor. The low pressure turbine includes counter rotatable low pressure inner and outer shaft rotors having low pressure inner and outer shafts, respectively, which are at least in part rotatably disposed co-axial with and radially inwardly of the high pressure rotor. The low pressure inner shaft rotor includes first low pressure turbine blade rows disposed across the low pressure turbine flowpath and drivingly connected to a first fan blade row by the low pressure inner shaft. The low pressure outer shaft rotor includes second low pressure turbine blade rows disposed across the low pressure turbine flowpath and drivingly connected to a second fan blade row by the low pressure outer shaft. The first and second fan blade rows are disposed within a bypass duct radially outwardly bounded by a fan casing. The first low pressure turbine blade rows includes at least one first interdigitated turbine blade row disposed between at least one second adjacent pair of the second low pressure turbine blade rows. The second low pressure turbine blade rows includes at least one second interdigitated turbine blade row disposed between at least a first adjacent pair of the first low pressure turbine blade rows. The low pressure turbine includes a plurality of rows of non-rotatable low pressure vanes. Each one of the rows of the non-rotatable low pressure vanes is disposed across the low pressure turbine flowpath between each non-interdigitated adjacent pair of the first and second low pressure turbine blade rows not having an interdigitated turbine blade row therebetween.

In the exemplary embodiment of the invention, at least one booster is drivingly connected to one of the low pressure inner and outer shafts and axially located between the first fan blade row and the high pressure rotor. A low pressure turbine nozzle is disposed axially forward, upstream of, and adjacent to the first low pressure turbine blade rows.

Various configurations of the low pressure turbine may be used. A forwardmost row of the second low pressure turbine blade rows may be interdigitated with an aftmost pair of the first low pressure turbine blade rows. The low pressure turbine may have an odd number of one of the first low pressure turbine blade rows or the second low pressure turbine blade rows and an even number of another of the first low pressure turbine blade rows or the second low pressure turbine blade rows. The low pressure turbine may have an odd number of the first low pressure turbine blade rows and an even number of the second low pressure turbine blade rows. The low pressure turbine may have three of the first low pressure turbine blade rows and four of the second low pressure turbine blade rows. The two forwardmost rows of the second low pressure turbine blade rows may be interdigitated with three aftmost rows of the first low pressure turbine blade rows.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
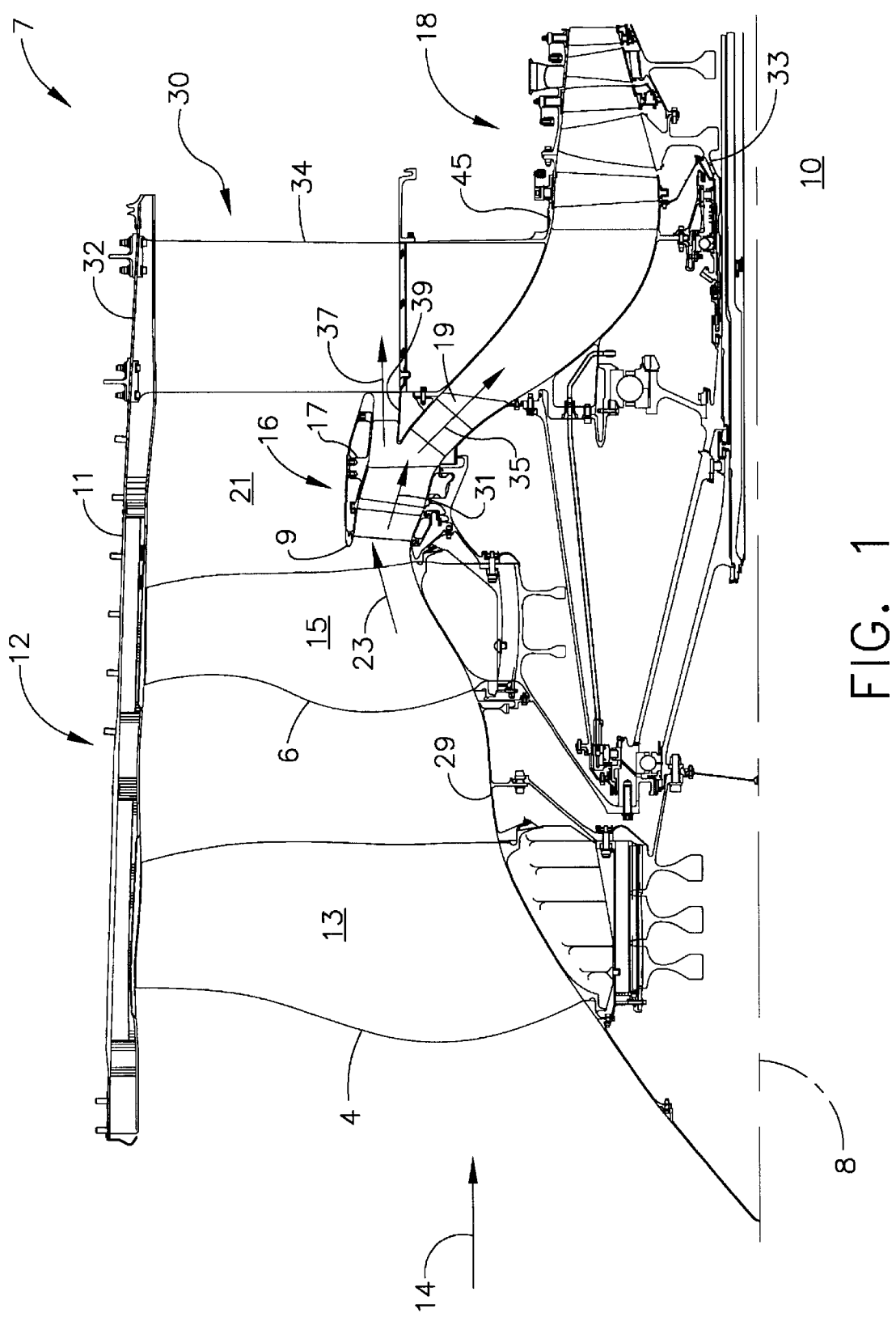
FIG. 1 is a longitudinal sectional view illustration of a forward portion of an exemplary embodiment of an aircraft turbofan gas turbine engine with a counter rotating low pressure turbine having stator vanes.

Illustrated schematically in FIG. 1 is a forward portion 7 of an exemplary turbofan gas turbine engine 10 circumscribed about an engine centerline 8 and having a fan section 12 which receives inlet airflow of ambient air 14. The engine 10 has frame structure 32 includes a forward or fan frame 34 connected by engine casing 45 to a turbine center frame 60 and a turbine aft frame 155. The engine 10 is mounted within or to an aircraft such as by a pylon (not illustrated) which extends downwardly from an aircraft wing.

Figure 2:
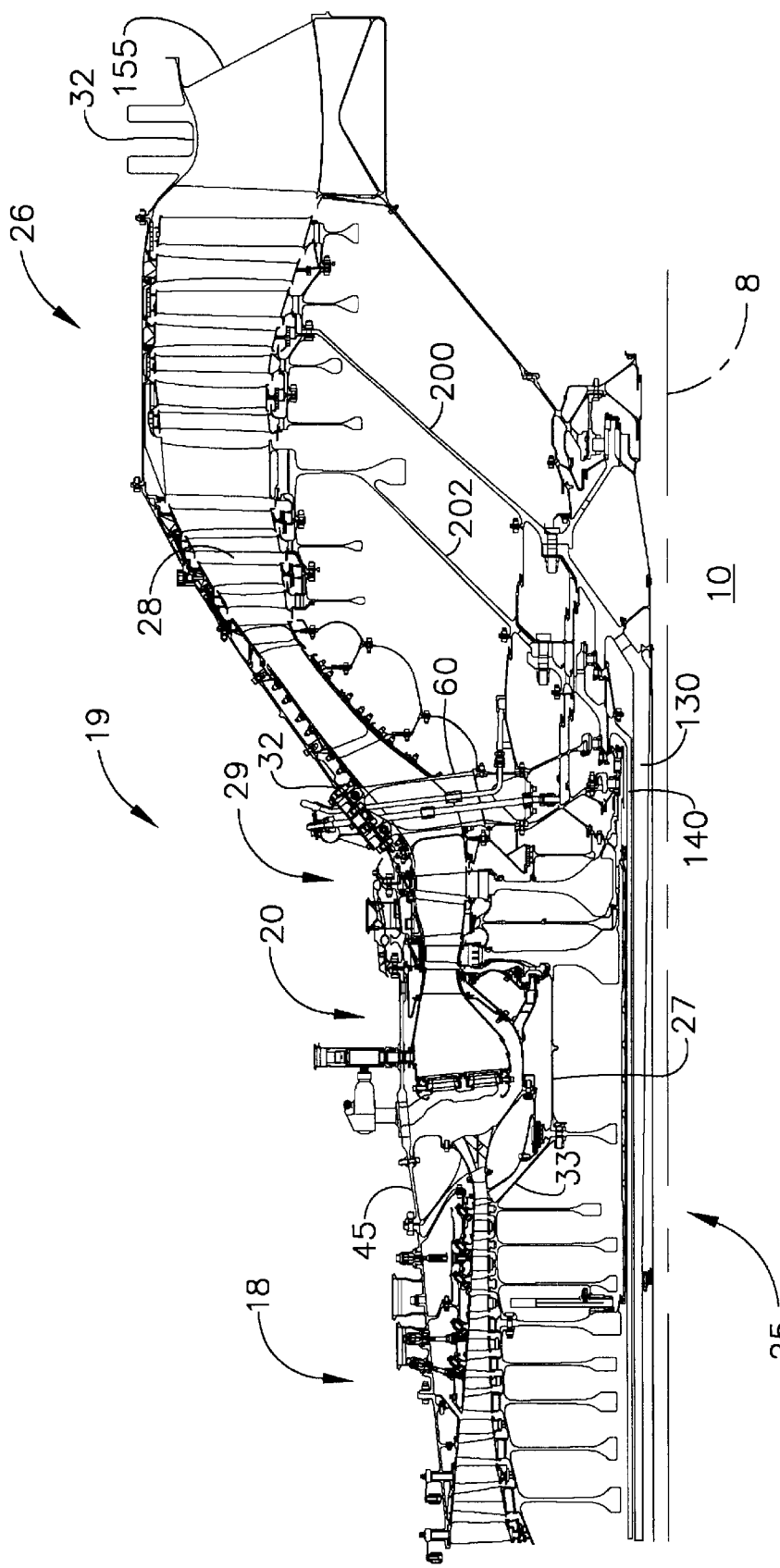
FIG. 2 is a longitudinal sectional view illustration of an aft portion of the engine.

The fan section 12 has counter rotating first and second fans 4 and 6 including first and second fan blade rows 13 and 15, respectively, and, in the exemplary embodiment of the invention illustrated herein, a booster 16. The booster 16 is axially located aft of the counter rotating first and second fan blade rows 13 and 15 and is surrounded by a splitter shroud 17 having a leading edge splitter 9. Boosters are generally axially located between a first fan blade row and a core engine and may be located between counter rotating first and second fan blade rows. An annular radially inner duct wall 29 radially inwardly bounds the booster 16. Following the fan section 12 is a high pressure compressor (HPC) 18 which is further illustrated in FIG. 2. FIG. 2 schematically illustrates an aft portion 22 of the engine 10.

Downstream of the HPC 18 is a combustor 20 which mixes fuel with the air 14 pressurized by the HPC 18 for generating combustion gases which flow downstream through a high pressure turbine (HPT) 24, and a counter rotating low pressure turbine (LPT) 26 from which the combustion gases are discharged from the engine 10. A high pressure shaft 27 joins the HPT 24 to the HPC 18 to substantially form a first or high pressure rotor 33. The high pressure compressor 18, combustor 20, and high pressure turbine 24 collectively are referred to as a core engine 25 which includes, for the purposes of this patent, the high pressure shaft 27. The core engine 25 may be modular such that as a single unit it can be independently replaced separate from the other parts of the gas turbine.

Referring back to FIG. 1, a bypass duct 21 is radially outwardly bounded by a fan casing 11 and in part the splitter shroud 17. The first and second fan blade rows 13 and 15 are disposed within a bypass duct 21 which is radially outwardly bounded by a fan casing 11. The splitter shroud 17 and leading edge splitter 9 splits fan flow air 23 exiting the second fan blade row 15 into a fan flow air first portion 35 into the booster 16 and a fan flow air second portion 37 around the booster 16 into the bypass duct 21 where it then exits the fan section 12 through a fan exit 30 providing thrust for the engine. Booster air 31, pressurized by the booster 16, exits the booster and is split into booster air first and second portions 35 and 37, respectively, by an inlet duct splitter 39. The inlet duct splitter 39 directs the booster air first portion 35 into an core engine inlet 19 leading to the high pressure compressor 18 of the core engine 25. The inlet duct splitter 39 also directs the booster air first portion 37 around the core engine 25 into the bypass duct 21 where it then exits the fan section 12 through the fan exit 30.

Figure 3:
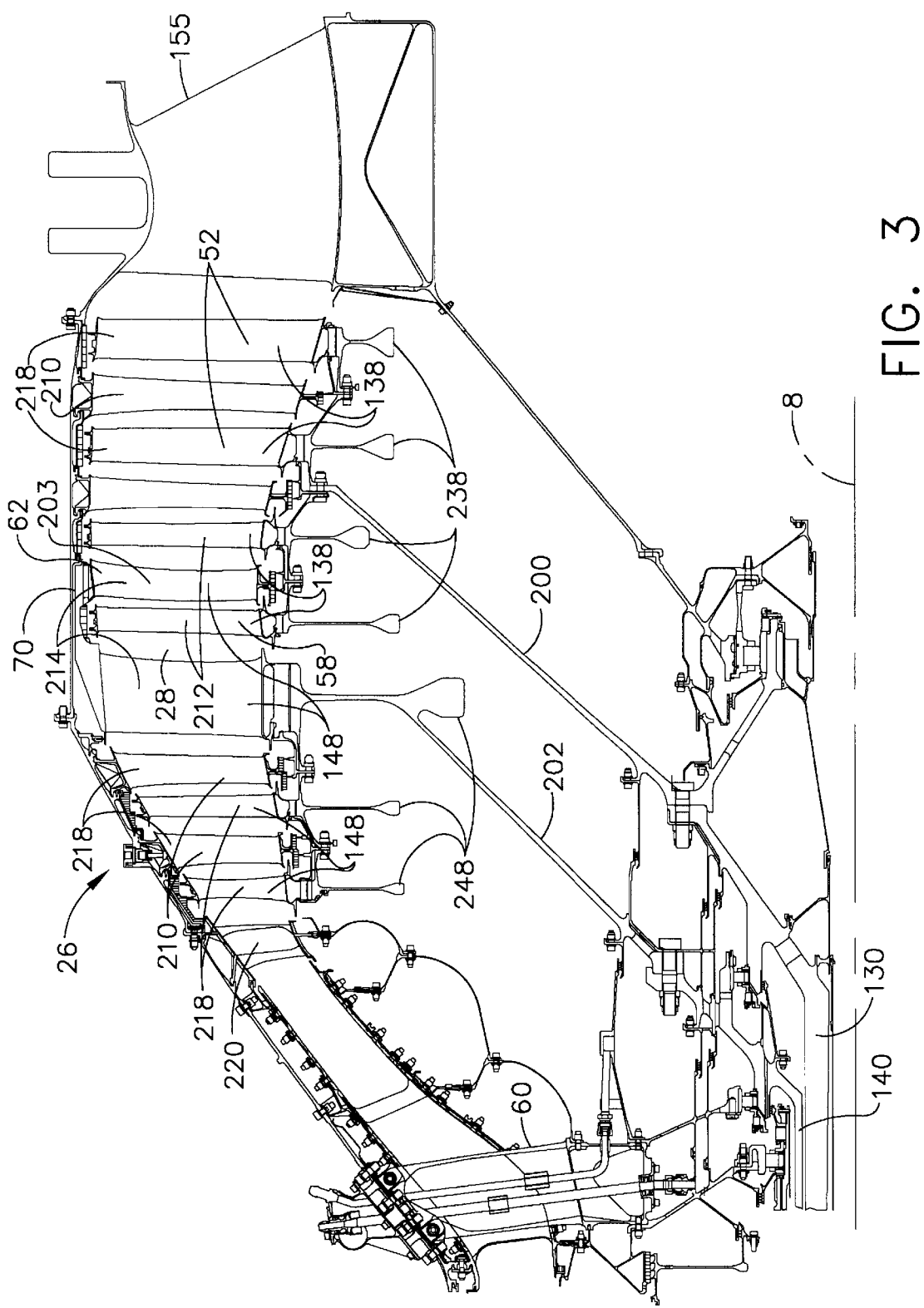
FIG. 3 is an enlarged view illustration of the counter rotating low pressure turbine illustrated in FIG. 1.

Referring now to FIGS. 2 and 3, the low pressure turbine 26 includes a low pressure turbine flowpath 28. The low pressure turbine 26 includes counter rotatable low pressure inner and outer shaft rotors 200 and 202 having low pressure inner and outer shafts 130 and 140, respectively, which are at least in part rotatably disposed co-axially with and radially inwardly of the high pressure rotor 33. The low pressure inner shaft rotor 200 includes low pressure first turbine blade rows 138 disposed across the low pressure turbine flowpath 28 and drivingly connected to the first fan blade row 13 by the low pressure inner shaft 130.

The low pressure outer shaft rotor 202 includes second low pressure turbine blade rows 148 disposed across the low pressure turbine flowpath 28 and drivingly connected to a second fan blade row 15 by the low pressure outer shaft 140. In the exemplary embodiment illustrated in FIGS. 2 and 3, there are four rows each of the first and second low pressure turbine blade rows 138 and 148. The booster 16 is drivingly connected to one of the low pressure inner and outer shafts 130 and 140.

As illustrated in FIGS. 2 and 3, the first low pressure turbine blade rows 138 includes at least one first interdigitated turbine blade row 58 disposed between at least one second adjacent pair 214 of the second low pressure turbine blade rows 148. The second low pressure turbine blade rows 148 includes at least one second interdigitated turbine blade row 62 disposed between at least one first adjacent pair 212 of the first low pressure turbine blade rows 138. One row of non-rotatable low pressure vanes 210 is disposed across the low pressure turbine flowpath 28 between each non-interdigitated adjacent pair 218 of the first and second low pressure turbine blade rows 138 and 148 not having an interdigitated turbine blade row therebetween.

The particular embodiment of the low pressure turbine 26 illustrated in FIG. 3 has one row of non-rotatable low pressure vanes 210 axially located between the aftmost pair 52 of the first low pressure turbine blade rows 138. Each one of the rows of non-rotatable low pressure vanes 210 is disposed between each non-interdigitated adjacent pair 218 of the first and second low pressure turbine blade rows 138 and 148 not having an interdigitated turbine blade row therebetween. There may be two or more first interdigitated turbine blade rows 58 disposed between second adjacent pairs 214 of the second low pressure turbine blade rows 148 and two or more second interdigitated turbine blade rows 62 disposed between first adjacent pairs 212 of the first low pressure turbine blade rows 138. A turbine nozzle 220 is disposed axially forward, upstream of, and adjacent to the first low pressure turbine blade rows 138. The first interdigitated turbine blade row 58 serves as a forwardmost row S0 of said low pressure second turbine blade rows 148 interdigitated with an aftmost pair 52 of the first low pressure turbine blade rows 138.

In FIG. 3, the low pressure inner shaft rotor 200 is illustrated as having the three of the four first low pressure turbine blade rows 138 mounted on low pressure first turbine disks 238. The low pressure outer shaft rotor 202 is illustrated as having and all the second turbine blade rows 148 mounted on low pressure second turbine disks 248. The last row of the first low pressure turbine blade rows 138 is the interdigitated turbine blade row 58. The interdigitated turbine blade row 58 depend from an outer annular drum extension 70 of the low pressure inner and outer shaft rotors 200. FIG. 3 generally illustrates an embodiment of the invention in which one of the counter rotatable low pressure inner and outer shaft rotors 200, 202 includes the rotatable drum extension 70 from which blades of one of the first and second interdigitated turbine blade rows 58, 62 of the first and second low pressure turbine blade rows 138, 148 depend radially inwardly.

Figure 4:
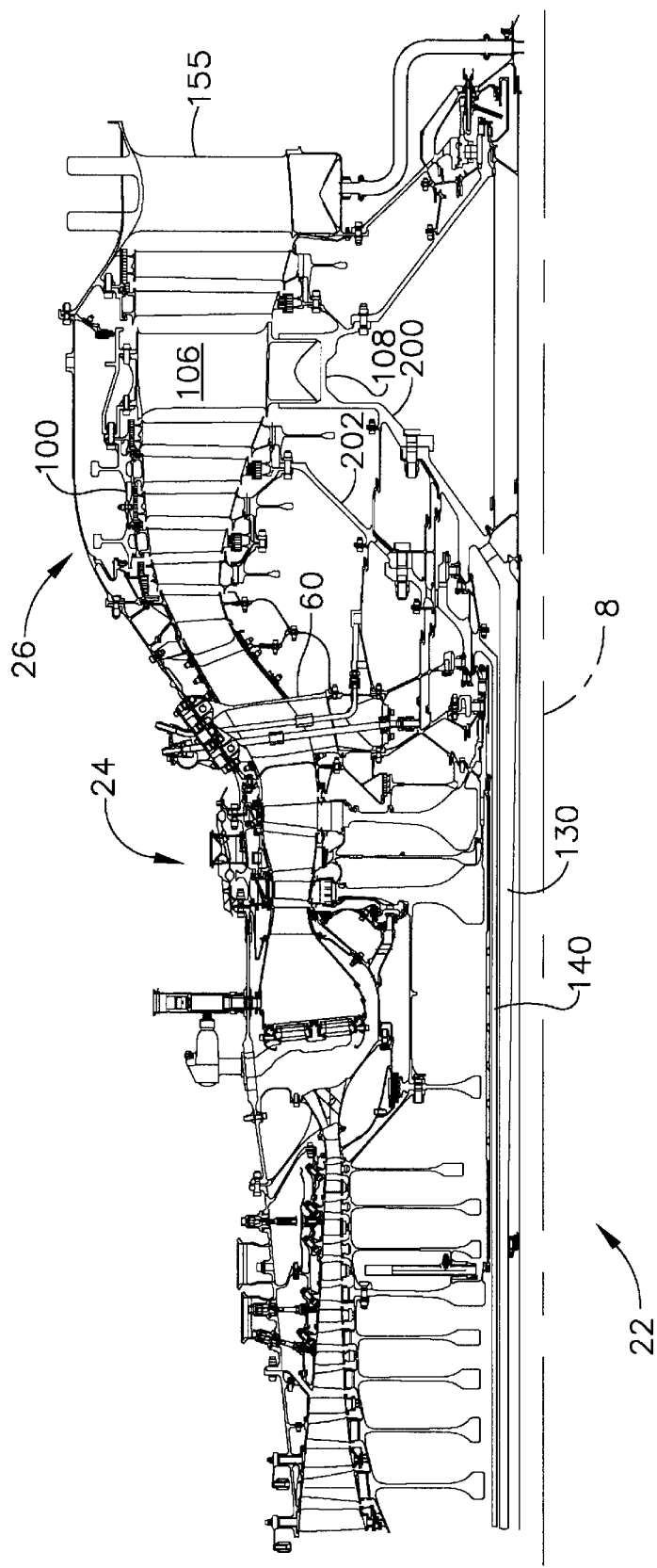
FIG. 4 is a longitudinal sectional view illustration of an aft portion of the engine having an alternative counter rotating low pressure turbine for the engine illustrated in FIG. 1.
Figure 5:
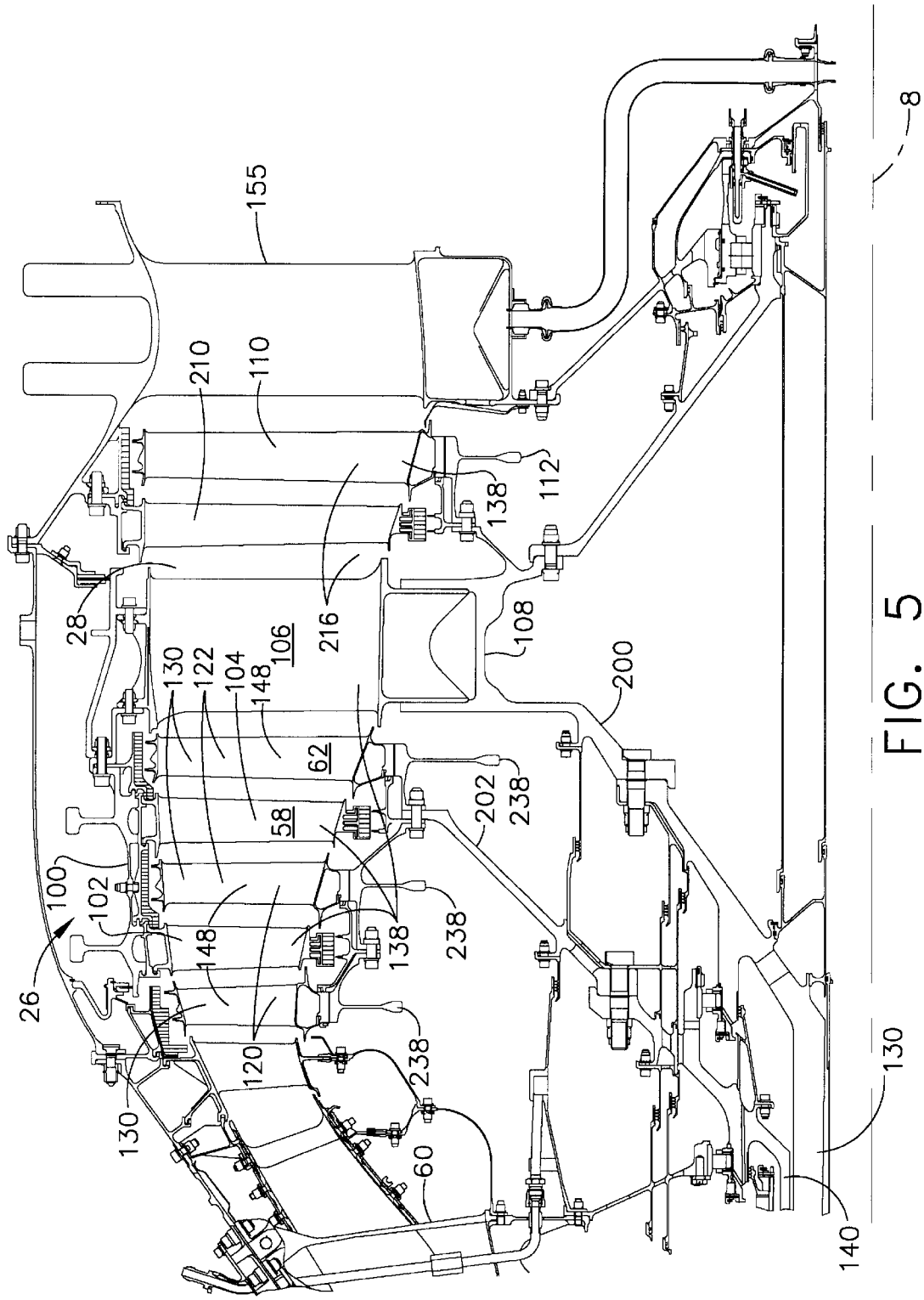
FIG. 5 is an enlarged view illustration of the alternative counter rotating low pressure turbine in aft portion of the engine illustrated in FIG. 4.

Illustrated in FIGS. 4 and 5 is an alternative embodiment of the low pressure turbine 26 in which a first and second rows 102 and 104, respectively, of the first low pressure turbine blade rows 138 are mounted on a low pressure radially outer second turbine drum 100. The second turbine drum 100 is part of the low pressure inner shaft rotor 200. The third row 106 of the first low pressure turbine blade rows 138 is part of a rotating frame 108 which supports the radially outer second turbine drum 100 and is rotatably supported by the center frame 60 and the aft turbine frame 155. An aftmost or fourth row 110 of the first low pressure turbine blade rows 138 is on a last stage turbine disk 112 which is connected to the rotating frame 108. The first and second rows 102 and 104 of the first low pressure turbine blade rows 138 are interdigitated with first and second adjacent pairs 120 and 122, respectively, of the second low pressure turbine blade rows 148. The second low pressure turbine blade rows 148 are mounted on low pressure first turbine disks 238. One row of the non-rotatable low pressure vanes 210 is disposed across the low pressure turbine flowpath 28 between an aftmost or last pair 216 of the first low pressure turbine blade rows 138. The non-rotatable low pressure vanes 210 are illustrated as being disposed between the third row 106 of the first low pressure turbine blade rows 138 on the rotating frame 108 and the aftmost or fourth row 110 on the last stage turbine disk 112.

Alternatively, the first and second low pressure turbine blade rows 138 and 148 can be mounted on low pressure radially inner and outer first and second turbine drums, respectively. There also can be more the first and second low pressure turbine blade rows 138 and 148 than illustrated in FIGS. 4 and 5 and more than two rows of the first and second low pressure turbine blade rows 138 and 148 may be interdigitated with more than two adjacent pairs of the first and second low pressure turbine blade rows 138 and 148.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. A gas turbine engine turbine assembly comprising:
    a low pressure turbine having a low pressure turbine flowpath,
    counter rotatable low pressure inner and outer shaft rotors having low pressure inner and outer shafts respectively,
    said low pressure inner shaft rotors including first low pressure turbine blade rows disposed across said low pressure turbine flowpath,
    said low pressure outer shaft rotor including second low pressure turbine blade rows disposed across said low pressure turbine flowpath,
    said first low pressure turbine blade rows including at least one first interdigitated turbine blade row disposed between at least one second adjacent pair of said second low pressure turbine blade rows,
    said second low pressure turbine blade rows including at least one second interdigitated turbine blade row disposed between at least one first adjacent pair of said first low pressure turbine blade rows, and
    at least one row of non-rotatable low pressure vanes disposed across said low pressure turbine flowpath between a non-interdigitated adjacent pair of said first and second low pressure turbine blade rows not having an interdigitated turbine blade row therebetween.

2. An assembly as claimed in claim 1 further comprising rows of non-rotatable low pressure vanes and non-interdigitated adjacent pairs of said low pressure first and second turbine blade rows not having an interdigitated turbine blade row therebetween wherein each one of said rows of non-rotatable low pressure vanes is disposed between one of said non-interdigitated adjacent pairs of said low pressure first and second turbine blade rows.

3. An assembly as claimed in claim 2 wherein a turbine nozzle is disposed axially forward, upstream of, and adjacent to said low pressure first turbine blade rows.

4. An assembly as claimed in claim 2 further comprising a forwardmost row of said low pressure second turbine blade rows interdigitated with an aftmost pair of said first low pressure turbine blade rows.

5. An assembly as claimed in claim 4 further comprising an odd number of one of said first low pressure turbine blade rows and said low pressure second turbine blade rows and an even number of another of said first low pressure turbine blade rows and said low pressure second turbine blade rows.

6. An assembly as claimed in claim 4 further comprising an odd number of said first low pressure turbine blade rows and an even number of said low pressure second turbine blade rows.

7. An assembly as claimed in claim 5 further comprising three of said first low pressure turbine blade rows and four of said low pressure second turbine blade rows.

8. An assembly as claimed in claim 2 further comprising two forwardmost rows of said low pressure second turbine blade rows interdigitated with three aftmost rows of said first low pressure turbine blade rows.

9. An assembly as claimed in claim 2 further comprising one of said counter rotatable low pressure inner and outer shaft rotors including a rotatable drum extension from which blades of one of said first and second interdigitated turbine blade rows of said first and second low pressure turbine blade rows depend radially inwardly.

10. An assembly as claimed in claim 9 further comprising a forwardmost row of said low pressure second turbine blade rows interdigitated with an aftmost pair of said first low pressure turbine blade rows.

11. An assembly as claimed in claim 10 further comprising an odd number of one of said first low pressure turbine blade rows and said low pressure second turbine blade rows and an even number of another of said first low pressure turbine blade rows and said low pressure second turbine blade rows.

12. An assembly as claimed in claim 10 further comprising an odd number of said first low pressure turbine blade rows and an even number of said low pressure second turbine blade rows.

13. An assembly as claimed in claim 12 further comprising three of said first low pressure turbine blade rows and four of said low pressure second turbine blade rows.

14. An assembly as claimed in claim 2 further comprising:
    said low pressure inner shaft rotor including a rotating frame,
    said rotating frame including one of said low pressure first turbine blade rows,
    a portion of said low pressure first turbine blade rows depending radially inwardly from a radially outer second turbine drum supported by said rotating frame, an aftmost row of said low pressure first turbine blade rows mounted on a last stage turbine disk connected to said rotating frame, and said row of non-rotatable low pressure vanes disposed between said one of said low pressure first turbine blade rows of said rotating frame and said aftmost row of said low pressure first turbine blade rows.

15. An assembly as claimed in claim 2 further comprising:

two forwardmost rows of said low pressure second turbine blade rows interdigitated with three aftmost rows of said first low pressure turbine blade rows, a rotatable drum on one of said counter rotatable low pressure inner and outer shaft rotors, said low pressure second turbine blade rows depending radially inwardly from said rotatable drum and interdigitated with said three aftmost rows of said first low pressure turbine blade rows and blades of one of said two forwardmost rows of said low pressure second turbine blade rows and said three aftmost rows of said first low pressure turbine blade rows depending radially inwardly from said rotatable drum.

16. An aircraft gas turbine engine assembly comprising:

a high pressure rotor including a high pressure turbine drivingly connected to a high pressure compressor by a high pressure shaft and rotatable about an engine centerline, a low pressure turbine having a low pressure turbine flowpath and located aft of said high pressure rotor, said low pressure turbine including counter rotatable low pressure inner and outer shaft rotors having low pressure inner and outer shafts respectively which are at least in part rotatably disposed co-axial with and radially inwardly of said high pressure rotor, said low pressure inner shaft rotor including first low pressure turbine blade rows disposed across said low pressure turbine flowpath and drivingly connected to a first fan blade row by said low pressure inner shaft, said low pressure outer shaft rotor including second low pressure turbine blade rows disposed across said low pressure turbine flowpath and drivingly connected to a second fan blade row by said low pressure outer shaft, at least one booster drivingly connected to one of said low pressure inner and outer shafts and axially located between said first fan blade row and said high pressure rotor, said first and second fan blade rows disposed within a bypass duct radially outwardly bounded by a fan casing, said first low pressure turbine blade rows including at least one first interdigitated turbine blade row disposed between at least one second pair of adjacent ones of said second low pressure turbine blade rows, said second low pressure turbine blade rows including at least one second interdigitated turbine blade row disposed between at least one first pair of adjacent ones of said first low pressure turbine blade rows, and at least one row of non-rotatable low pressure vanes disposed across said low pressure turbine flowpath between a third pair of adjacent ones of said low pressure first and second turbine blade rows.

17. An assembly as claimed in claim 16 further comprising a plurality of rows of non-rotatable low pressure vanes wherein each one of said rows of non-rotatable low pressure vanes is disposed between each adjacent pair of said low pressure first and second turbine blade rows not having an interdigitated turbine blade row therebetween.

18. An assembly as claimed in claim 17 wherein a turbine nozzle is disposed axially forward, upstream of, and adjacent to said low pressure first turbine blade rows.

19. An assembly as claimed in claim 17 further comprising a forwardmost row of said low pressure second turbine blade rows interdigitated with an aftmost pair of said first low pressure turbine blade rows.

20. An assembly as claimed in claim 19 further comprising an odd number of one of said first low pressure turbine blade rows and said low pressure second turbine blade rows and an even number of another of said first low pressure turbine blade rows and said low pressure second turbine blade rows.

21. An assembly as claimed in claim 19 further comprising an odd number of said first low pressure turbine blade rows and an even number of said low pressure second turbine blade rows.

22. An assembly as claimed in claim 20 further comprising three of said first low pressure turbine blade rows and four of said low pressure second turbine blade rows.

23. An assembly as claimed in claim 17 further comprising two forwardmost rows of said low pressure second turbine blade rows interdigitated with three aftmost rows of said first low pressure turbine blade rows.

24. An assembly as claimed in claim 16 further comprising one of said counter rotatable low pressure inner and outer shaft rotors including a rotatable drum extension from which blades of one of said first and second interdigitated turbine blade rows of said first and second low pressure turbine blade rows depend radially inwardly.

25. An assembly as claimed in claim 24 further comprising a forwardmost row of said low pressure second turbine blade rows interdigitated with an aftmost pair of said first low pressure turbine blade rows.

26. An assembly as claimed in claim 25 further comprising an odd number of one of said first low pressure turbine blade rows and said low pressure second turbine blade rows and an even number of another of said first low pressure turbine blade rows and said low pressure second turbine blade rows.

27. An assembly as claimed in claim 25 further comprising an odd number of said first low pressure turbine blade rows and an even number of said low pressure second turbine blade rows.

28. An assembly as claimed in claim 27 further comprising three of said first low pressure turbine blade rows and four of said low pressure second turbine blade rows.

29. An assembly as claimed in claim 17 further comprising:

said low pressure inner shaft rotor including a rotating frame, said rotating frame including one of said low pressure first turbine blade rows, a portion of said low pressure first turbine blade rows depending radially inwardly from a radially outer second turbine drum supported by said rotating frame, an aftmost row of said low pressure first turbine blade rows mounted on a last stage turbine disk connected to said rotating frame, and said row of non-rotatable low pressure vanes disposed between said one of said low pressure first turbine blade rows of said rotating frame and said aftmost row of said low pressure first turbine blade rows.

30. An assembly as claimed in claim 17 further comprising:
- two forwardmost rows of said low pressure second turbine blade rows interdigitated with three aftmost rows of said first low pressure turbine blade rows,
- a rotatable drum on one of said counter rotatable low pressure inner and outer shaft rotors,
- said low pressure second turbine blade rows depending radially inwardly from said rotatable drum and interdigitated with said three aftmost rows of said first low pressure turbine blade rows and
- blades of one of said two forwardmost rows of said low pressure second turbine blade rows and said three aftmost rows of said first low pressure turbine blade rows depending radially inwardly from said rotatable drum.

* * * * *